United States Patent Office 3,329,341
Patented July 4, 1967

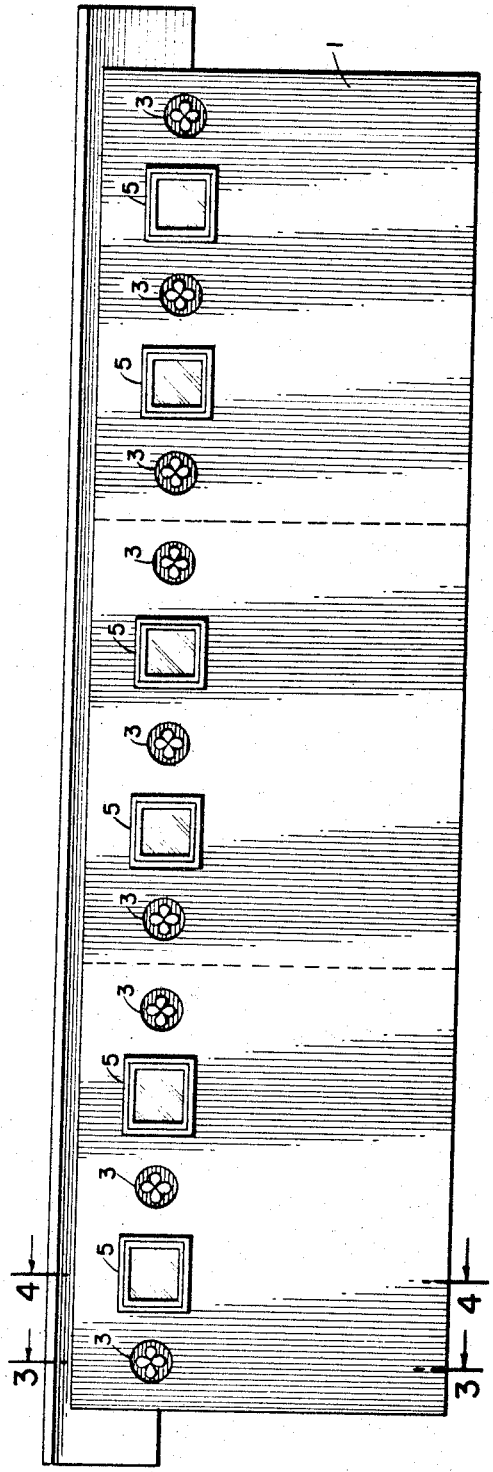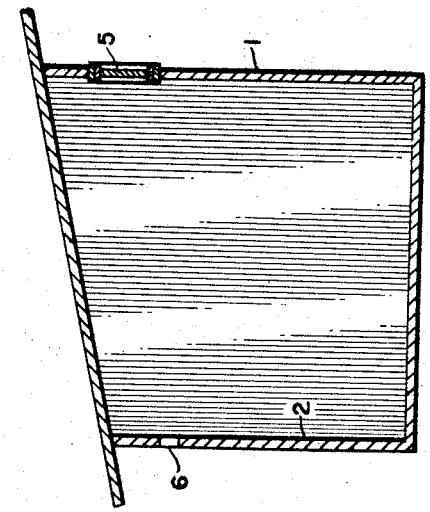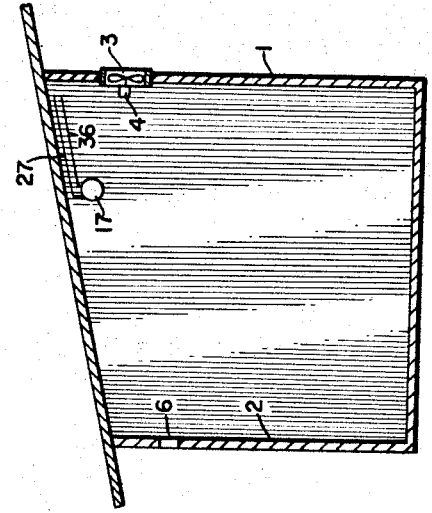

3,329,341
VENTILATION SYSTEM FOR BUILDINGS
Roland S. Jones, Parsonsburg, Md. 21849
Filed Jan. 29, 1964, Ser. No. 340,941
8 Claims. (Cl. 236—46)

This invention relates to automatic ventilation systems for buildings. While applicable to various types of buildings, it has special utility when used for poultry houses, and will be described, by way of example, as applied to such houses.

In a modern poultry house where many thousands of chickens, such as "broilers" are confined, it is of the utmost importance to maintain the atmosphere in the house in such condition as will promote the health and vigor of the fowls.

Although heaters are sometimes provided in cold climates to protect the chickens against severe freezing, the usual and most important problem is to avoid the occurrence of excessively high temperatures in summer.

To this end, it has been the common practice to provide ventilation fans set into the wall of the house, and controlled by thermostats, to produce the desired circulation of air. These fans may be arranged, especially in winter, to blow out, to carry away the foul air and ammonia fumes, while during the heat of the summer it is usual to arrange the fans to blow in, so as to bring in fresher and cooler air from the outside.

Instead of controlling the fans by thermostats, it has also been proposed to control them by means of a time clock, so arranged that the fans operate periodically for a definite number of minutes at a time.

But these prior systems have failed to automatically ond satisfactorily take care of all the various conditions encountered in the operation of the large poultry plants which exist today.

To produce a more flexible and efficient system, I install both a thermostat and a time clock, and provide manually operated means for selectively connecting each of the fans so as to be controlled by either the thermostat or the time clock, as may be desired.

Broiler houses are usually long, relatively narrow buildings with ventilation openings or windows along one side. In accordance with the present invention, I divide such a building into three or more communicating zones, all of the fans of each zone being controlled by a separate thermostat, so that each zone is independent of the others. Thus one zone, because of its location, or the direction of the wind at any given time, may be warmer than the other zones, and, in that case, the thermostat in the relatively warm zone would cause the fans in that zone to operate, while the fans in the other zones would remain idle.

I also provide a time clock for periodically putting into operation one or more of the fans as desired, and an important object of the invention is to devise means whereby, if, at the end of any time period, or upon failure of the time clock, the temperature in the house remains above that for which the thermostat is set, the thermostat will automatically take control, and will cause the fans to continue to operate independently of said time clock.

Another object of the invention is to devise, in a house having both windows and motor driven fans located in a wall thereof, means for automatically opening said windows upon failure of the current supply to said fan motors.

An ancillary object is to provide means for operating an alarm, upon failure of the current supply to the fan motors.

A still further object of the invention is to devise means, when fans are set to blow either inward or outward, for preventing said fans from being put into operation if the temperature outside the house is higher than that inside.

Yet another object is to provide means for preventing the fans from being put into operation to draw air into the house if the humidity of the outside air exceeds a predetermined figure.

With the above and other objects in view, and to improve generally on house ventilation systems, the invention consists in the construction and arrangement of parts hereinafter described and claimed, and illustrated in the accompanying drawings, forming part of this specification, and in which:

FIG. 2 is a front elevation of a conventional broiler house showing an arrangement of fans and windows, in accordance with the invention;

FIG. 3 is a transverse vertical section on the line 3—3 of FIG. 2, looking in the direction of the arrows;

FIG. 4 is a transverse vertical section on the line 4—4 of FIG. 2, looking in the direction of the arrows;

Figure 1:
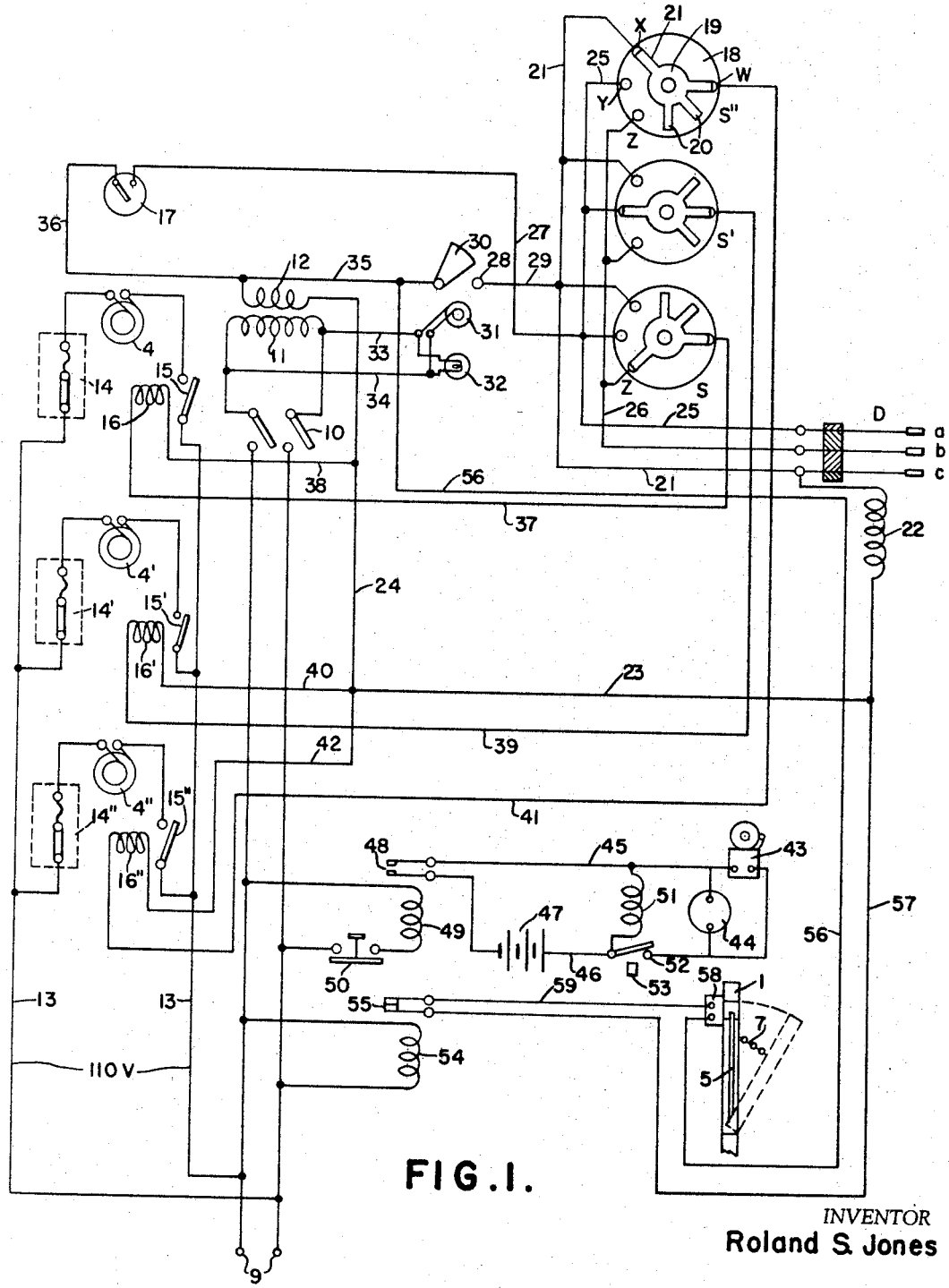
FIG. 1 is a diagram of circuits which I employ.

Referring to the drawings in detail and more particularly first to FIGS. 2 to 4 thereof, I have illustrated a conventional poultry house having front wall 1 and a rear wall 2 and divided as indicated by the dotted lines into three or more communicating areas or zones. Each area or zone may be equipped with one or more motor driven fans and windows in the front wall. By way of example, three such fans 3, and two windows 5, are illustrated. In FIG. 3 each fan is shown as driven by an electric motor 4.

It is customary to form an elongated slot 6 in the rear wall of the house so as to give cross ventilation. Thus, if the fans are set to blow out, they will draw air into and across the house from this slot, or, if the fans are set to blow inwardly, the air will be driven out through this slot.

Or, in some cases, if the slot is not used, fans may be provided in both front and rear walls. Also, in some cases, movable windows may be omitted.

Figure 5:
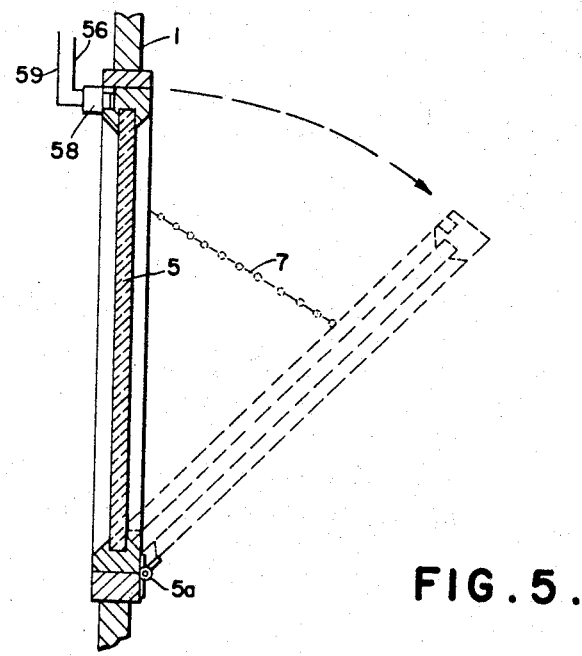
FIG. 5 is a vertical section on an enlarged scale through one of the windows.

One or the windows is shown on an enlarged scale in FIG. 5. It is illustrated as comprising a sheet of glass set into a frame which is hinged at 5a so that it can swing outward to dotted line position to afford ventilation. The outward movement may be limited by a stop chain 7.

Referring now to FIG. 1, I have illustrated the electric circuits which I employ for controlling the fans and windows. A pair of mains 9 supply current, at the usual available voltage of 110 volts, to the equipment, and the current is controlled by a main switch 10. This is connected with a transformer having windings 11 and 12, the winding 12 being so designed as to step down the voltage to a relatively low value such as 24 volts. This voltage is used in connection with the control switches and relays.

Another branch of the 110 volt supply circuit 9 is shown at 13 and the motors 4, 4' and 4'' draw their current from this line. The motors 4, 4' and 4'' are shown as provided with the usual switch and fuse boxes 14, 14' and 14'' in their circuits.

The motors 4, 4' and 4" are controlled by relays comprising armatures 15, 15' and 15" operated by coils 16, 16' and 16".

A thermostat 17 is employed and is located at any desired position in the poultry house zone.

To control the motor relays above described I provide three hand operated rotary switches S, S' and S", each comprising a base 18 of insulating material having four separate contacts $x$, $y$, $z$ and $w$ carried thereby. Mounted on the base 18 is a rotary member 19 having a group of three radially extending arms 20 adapted to engage the contact $w$ and a fourth radially extending arm 21 adapted to selectively engage any of the three contacts, $x$, $y$ and $z$. It will thus be seen that whatever the position of the arm 21 one of the arms 20 will always engage the contact $w$.

All of the contacts $x$ are connected together by wire 21 which is connected by wire 29 to a contact 28 of a periodic timing switch having a blade 30 adapted to sweep over the contact 28. This timing switch is driven by a motor 31 connected by wires 33 and 34 across the 110 volt circuit, inside of the main switch 10 and a signal light 32 is preferably also connected with these wires in parallel with the motor 31. When the blade 30 is in engagement with the contact 28, one side of the transformer winding 12 is connected through wires 35 and 29 with the wire 21 so that all of the contacts $x$ are energized.

One terminal of the thermostat 17 is connected through wire 27 to wire 25 which is connected with all of the contacts $y$ of the rotary switches, and the other terminal of the thermostat is connected through wire 36 with one side of the transformer winding 12.

In addition to the three rotary switches above described I employ a zone relay D having three contacts $a$, $b$ and $c$. The contact $a$ is connected to wire 25, the contact $c$ is connected to wire 21, and the contact $b$ is connected through wire 26 with all of the contacts $z$.

The relay D has an operating winding 22, one end of which is connected with the wire 21, and the other end of which is connected by wire 23 with wire 24 leading to the other side of the transformer winding 12. The contacts $w$ are connected by wires 37, 39 and 41, respectively, with one side of the relay windings 16, 16' and 16", the other side of these windings being connected by wires 38, 40 and 42, with the wire 24, leading to the other side of the transformer winding 12.

The several rotary switches S, S' and S" may be set in any one of three operative positions. By way of example, I have illustrated the switch S" as set in engagement with the contact $x$, the switch S' in engagement with the contact $y$ and the switch S in engagement with the contact $z$. The invention, however, is in no sense limited to the setting of these three rotary switches in the positions shown. The upper two of them might, for example, be both set in engagement with the contact $x$. However, at least one of the group, as shown by switch S, is set into engagement with the contact $z$, as a safety feature in case of failure of the timing switch.

The contact $x$ is referred to as the "Time Contact." The contact $y$ is the thermostat contact and the contact $z$ is referred to as "Time and Temperature."

The operation of the system as so far described will now be explained.

The periodic timer is so designed that the blade 30 constantly rotates, driven by the motor 31, and periodically closes the circuit at contact 28 for a certain number of minutes out of the compelte cycle. Thus, if, by way of example, the complete cycle is twelve minutes, the blade 30 may be of such width as to close the circuit at 28 for three minutes of the twelve. Assuming that the blade 30 engages the contact 28, current will flow from one side of the transformer winding 12 through wires 35 and 29 to wire 21 and thence through winding 22 and wire 23 and back to the other side of the transformer. This energizes the relay D and so long as it is energized the contacts $b$ and $c$ are held together. Thus, current will be supplied from the wire 21 to contacts $x$ and will pass from contact $c$ to contact $b$ and thence to contacts $z$ of the three rotary switches. Any of these switches such as the switch S" which happens to be set on the contact $x$ will result in delivering current from wire 29 through wire 21, contact $x$, switch member 19, contact $w$, wire 41, relay winding 16", wire 42, to the other side of the transformer. This energizes relay winding 16", closing the circuit to the motor 4", at 15", thus putting this fan into operation. It will continue to operate so long as the blade 30 of the timer is in engagement with the contact 28. The operation of this fan results in blowing out and removing from the poultry house ammonia fumes, excess moisture, etc., as well as in cooling the zone.

If the selector switch S', as well as 5" had been set on contact x, then both fan motors 4" and 4' would have been put into operation by the timer.

At the end of the time period the blade 30 moves off the contact 28 and opens the circuit just described, thus stopping the fan motor 4". This also deenergizes the relay winding 22 and permits the contacts $b$ and $c$ to separate at the same time automatically bringing contacts $a$ and $b$ into engagement. If, at this moment, the temperature in the zone of the house is higher than that for which the thermostat 17 is set, current will flow through the thermostat from one side of the transformer winding 12, through wire 27 to wire 25 connecting all of the contacts $y$ and thence through any switch such as S' which happens to be in engagement with contact $x$ to the relay controlling fan motor 4'. Current will also flow through relay contacts $a$ and $b$ through wire 26 to the contacts $z$. Thus, current flows through any switch such as S which had been set on contact $z$ through wire 37 to winding 16 of the motor relay thus closing the circuit of motor 4 at 15 and causing that fan to operate. Thus both fan motors 4 and 4' will operate under the control of the thermostat. These fans will continue to operate as long as the temperature remains above that for which the thermostat is set, thus continuously cooling the poultry house zone after the timing switch has shut off, or if it has failed. These fans will continue to operate at least until the next time cycle is completed and the timing switch again energizes the wire 21 and relay coil 22. This, of course, brings the fan controlled by S" into operation. If, at the end of this second time period the temperature is still too high, the relay D will again cause the motor controlled by switch S to go into operation and this will continue until the end of the next time cycle or until the temperature has been sufficiently reduced.

Thus, by my improved arrangement I provide for periodically operating one or more of the fans, a few minutes at a time, to remove the fumes and cool the zone under normal conditions, but if, for any reason, the temperature rises unduly under these conditions one or more additional fans are brought into operation by the thermostat to rapidly cool the zone and this continues until the temperature is reduced to the proper point.

In modern large poultry plants where many thousands of chickens are confined in a single house the question of maintaining proper ventilation is of utmost important. If, in a system as above described, the supply of current to the motors should for any reason fail so that the motors do not operate the effect on the flock might be disastrous.

To guard against such a contingency I have made two emergency provisions. First, I have connected across the line 9 a relay winding 49, in the circuit of which is preferably connected a normally closed push button switch 50. As long as this relay 49 is energized the contacts 48 thereof are held open. A source of current 47, independent of the motor supply, such as a set of dry batteries, is provided and the two sides of this battery are connected through wires 45 and 46 to suitable signal devices such as a lamp 44 and a bell 43. Upon failure of current through the coil 49, the contacts 48 automatically close, thus putting these signal devices into operation.

Preferably interposed in the circuit to the signal devices is a drop type relay coil 51 operating an armature which engages a contact 52. The arrangement is such that when the relay winding 49 is de-energized the contacts 48 close, thus energizing the winding 51 and dropping the armature into engagement with the contact 52. The construction is such that this armature will remain in such engagement and will keep the signal devices operating until the attendant re-sets the drop relay as by means of a push button 53. In other words, the signal devices 43 and 44, having been initially operated by the relay 49, remain in operation until released by the attendant. The light 44 may be displayed at a point above the poultry house so as to be readily seen, while the alarm 43 may be mounted in the attendant's sleeping quarters. The push button 50 is provided as a test device to de-energize the relay 49 from time to time to determine whether the signals are working properly.

Secondly, I connect across the line 9 another relay winding 54 which so long as it is energized keeps the contacts 55 closed, thus energizing an electric lock 58 over wires 56, 57 and 59. This electric lock serves to hold the windows 5 closed. Upon failure of the current supply the contacts 55 will open and the lock 58 will release the windows 5 so that they may automatically swing open. This may be accomplished by so balancing the windows that they may be opened by gravity when released or a suitable spring may be employed.

Thus upon failure of the current supply the windows 5 are automatically opened so as to prevent the poultry from being suffocated.

While I have shown and described the lock 58 as being normally energized so as to hold the windows closed, it may be just as well arranged to hold the windows closed when deenergized, so that they are released by the energization of this lock.

As already mentioned it is common practice to arrange ventilating fans to provide fresh and cool air in hot weather. I have found, however, that it is undesirable to have the fans operate if by any chance the temperature of the air outside is higher than that inside, or if the humidity of the outside air is very high.

Figure 6:
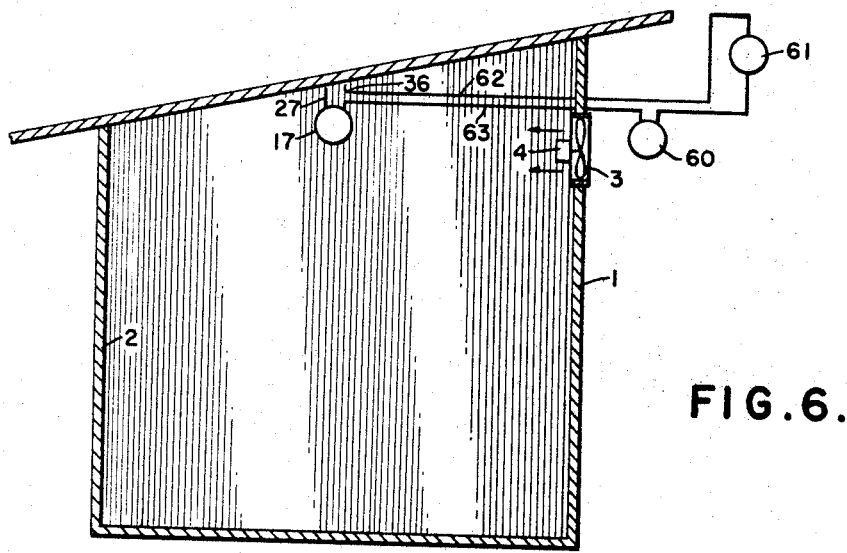
FIG. 6 is a view similar to FIGS. 3 and 4, but showing some additional features.

Referring to FIG. 6 I have shown means for controlling the fans in such a way that they will not operate to blow air into the building if either of the above mentioned conditions exist.

This is accomplished by the use of an outside thermostat 60 connected in series with the thermostat 17 by means of wires 62 and 63. Thus, if the temperature outside is so high that the contacts of the thermostat 60 remain open the fans will not operate, no matter what the condition of the inside thermostat 17 may be.

To prevent the fans from bringing into the house air which is too heavily laden with moisture and is thus undesirable, I include in series with the two thermostats a humidistate 61. Thus, if the humidity of the outside air exceeds a predetermined limit for which the humidistat is set, then regardless of the condition of the two thermostats 17 and 60 the fans will not operate. Thus, the fans are prevented from operating in the manner heretofore described, controlled by the thermostat 17, if either the temperature or humidity of the outside air is excessive.

It will be understood that where, in the claims, I use the word window I mean to include any opening having a movable closure.

It will be further understood that the invention is in no sense limited to the particular construction and arrangement as shown in the drawings, as these drawings are only illustrative of one embodiment of the invention.

What I claim is:

1. The combination with a house, of a series of motor driven ventilating fans mounted in a wall thereof, a thermostat in said house, a periodic timing switch, and manually operated switching means for selectively connecting any desired one of said fans with said thermostat to be controlled thereby, and for selectively connecting other of said fans with said periodic timing switch to be operated thereby.

2. The combination with a house, of a series of motor driven ventilating fans mounted in a wall thereof, a thermostat in said house, a periodic timing switch, manually operated switching means for selectively connecting said timing switch with one or more of said fans to operate the same during a timing period, and for selectively establishing a partial connection between other of said fans and said thermostat, a relay energized and de-energized by said timing switch and having contacts interposed in said connection, whereby, at the end of each timing period, the connection is completed between at least one of said other fans and said thermostat.

3. A ventilating system in accordance with claim 1 in which the fans are arranged to draw air into the house, and in which means are provided for preventing said thermostat from putting any fan in operation if the humidity of the air outside of said house rises to a predetermined point.

4. A ventilating system in accordance with claim 1 in which the fans are arranged to draw air into the house, in which there is a circuit by which said thermostat controls the fans, and in which a humidistat is located outside of the house and is connected in said circuit in series with said thermostat.

5. The combination with a house, of a plurality of ventilating fans mounted in a wall thereof, a thermostat in said house, a periodic timer, manually operated selective switching means for connecting said timer to one or more selected fans to control the same, and for connecting other selected fans to said thermostat, to be controlled thereby, a relay controlled by said timer and having contacts in the circuit of said thermostat whereby, if, at the end of any given time period, or upon failure of said timer, the temperature in said house remains above that for which said thermostat is set, the said relay will cause said thermostat to take control, and to automatically put one or more of said other fans into operation.

6. The combination with a house, of a series of ventilating fans mounted in a wall thereof, a thermostat in said house, a periodic timer, a relay controlled by said timer, manually operated switching means for connecting said timer to one or more selected fans to operate the same, and for connecting, through the contacts of said relay, one or more other selected fans to said thermostat to be controlled thereby, whereby, at the end of any time period said time controlled fans will stop, and the relay will be actuated, and upon actuation of said relay said thermostat controlled fans will be automatically put into operation, if the temperature in the house remains above that for which the thermostat is set.

7. The combination with a house, of a series of motor driven ventilating fans mounted in a wall thereof, a thermostat in said house, a periodic timer, a plurality of independent selector switches, each switch having three selector contacts and a fourth contact constituting a common terminal, the corresponding selector contacts of all of the switches being connected together in parallel and constituting a group, and the common terminal of each switch being connected to control the motor of one of said fans, said timer being connected between a source of current and one group of contacts, and said thermostat being connected between a source of current and a second group of contacts.

8. The combination with a house, of a series of motor driven ventilating fans mounted in a wall thereof, a thermostat in said house, a periodic timer, a plurality of independent selector switches, each switch having three selector contacts, and a fourth contact constituting a common terminal, the corresponding selector contacts of all of the switches being connected together in parallel and constituting a group, and the common terminal of each switch being connected to control the motor of one of said fans, said timer being connected between a source of current and one group of contacts, and said thermostat being connected between a source of current and a second group of contacts, a relay controlled by said timer, and means governed by the contacts of said relay for supplying current to a third group of contacts.

References Cited

UNITED STATES PATENTS

| | | | |
|---|---|---|---|
| 2,261,852 | 11/1941 | Mathis | 236—49 X |
| 2,349,627 | 5/1944 | Kemmer et al. | 98—43 |
| 2,601,028 | 6/1952 | Kersten. | |
| 3,128,158 | 4/1964 | Colvin et al. | |
| 3,142,245 | 7/1964 | Shoham | 98—43 |

FOREIGN PATENTS 727,020  3/1955  Great Britain.

NEIL C. READ, *Primary Examiner.*

R. M. ANGUS, D. YUSKO, *Assistant Examiners.*